United States Patent
Yadav et al.

(10) Patent No.: US 6,719,821 B2
(45) Date of Patent: Apr. 13, 2004

(54) PRECURSORS OF ENGINEERED POWDERS

(75) Inventors: Tapesh Yadav, Longmont, CO (US); Elena Mardilovich, Corvallis, OR (US)

(73) Assignee: NanoProducts Corporation, Longmont, CO (US)

( * ) Notice: Subject to any disclaimer, the term of this patent is extended or adjusted under 35 U.S.C. 154(b) by 0 days.

(21) Appl. No.: 10/071,027

(22) Filed: Feb. 8, 2002

(65) Prior Publication Data

US 2002/0178865 A1 Dec. 5, 2002

Related U.S. Application Data

(60) Provisional application No. 60/267,653, filed on Feb. 12, 2001.

(51) Int. Cl.$^7$ ................................................. B22F 9/24
(52) U.S. Cl. ........................... 75/343; 75/351; 75/362; 75/369; 75/371; 423/327.1; 423/331; 423/608; 423/622; 423/625; 423/628; 502/340; 502/341; 502/349; 502/355
(58) Field of Search ..................... 75/343, 351, 362, 75/369, 371, 370; 423/327.1, 331, 608, 622, 625, 628; 502/340, 341, 349, 355

(56) References Cited

U.S. PATENT DOCUMENTS

| | | | |
|---|---|---|---|
| 4,649,037 A | * | 3/1987 | Marsh et al. ............... 423/628 |
| 5,358,695 A | | 10/1994 | Helble et al. |
| 5,788,738 A | * | 8/1998 | Pirzada et al. ............... 75/331 |
| 5,984,997 A | | 11/1999 | Bickmore et al. |
| 6,165,247 A | | 12/2000 | Kodas et al. |
| 6,344,271 B1 | | 2/2002 | Yadav et al. |

OTHER PUBLICATIONS

CRC Handbook of Chemistry and Physics, 54$^{th}$ edition, 1973, pp. F45–F–51.
International Search Report, PCT/US02/03636 (Dec. 3, 2002).

* cited by examiner

Primary Examiner—George Wyszomierski
(74) Attorney, Agent, or Firm—Stuart T. Langley; Hogan & Hartson LLP

(57) ABSTRACT

The production and selection of precursor mixtures used to produce fine powders and methods for making fine powders using the selected precursor. The precursor mixture comprises at least one metal containing precursor, the metal containing precursor has an average molecular weight of less than 2000 grams per unit mol of the metal, the metal containing precursor has a normal boiling point greater than 350K, and the viscosity of the precursor mixture is between 0.1 to 250 cP. The precursor mixture is processed under conditions that produce a fine powder from the precursor mixture. Fine powders produced are of size less than 100 microns, preferably less than 10 micron, more preferably less than 1 micron, and most preferably less than 100 nanometers.

15 Claims, 4 Drawing Sheets

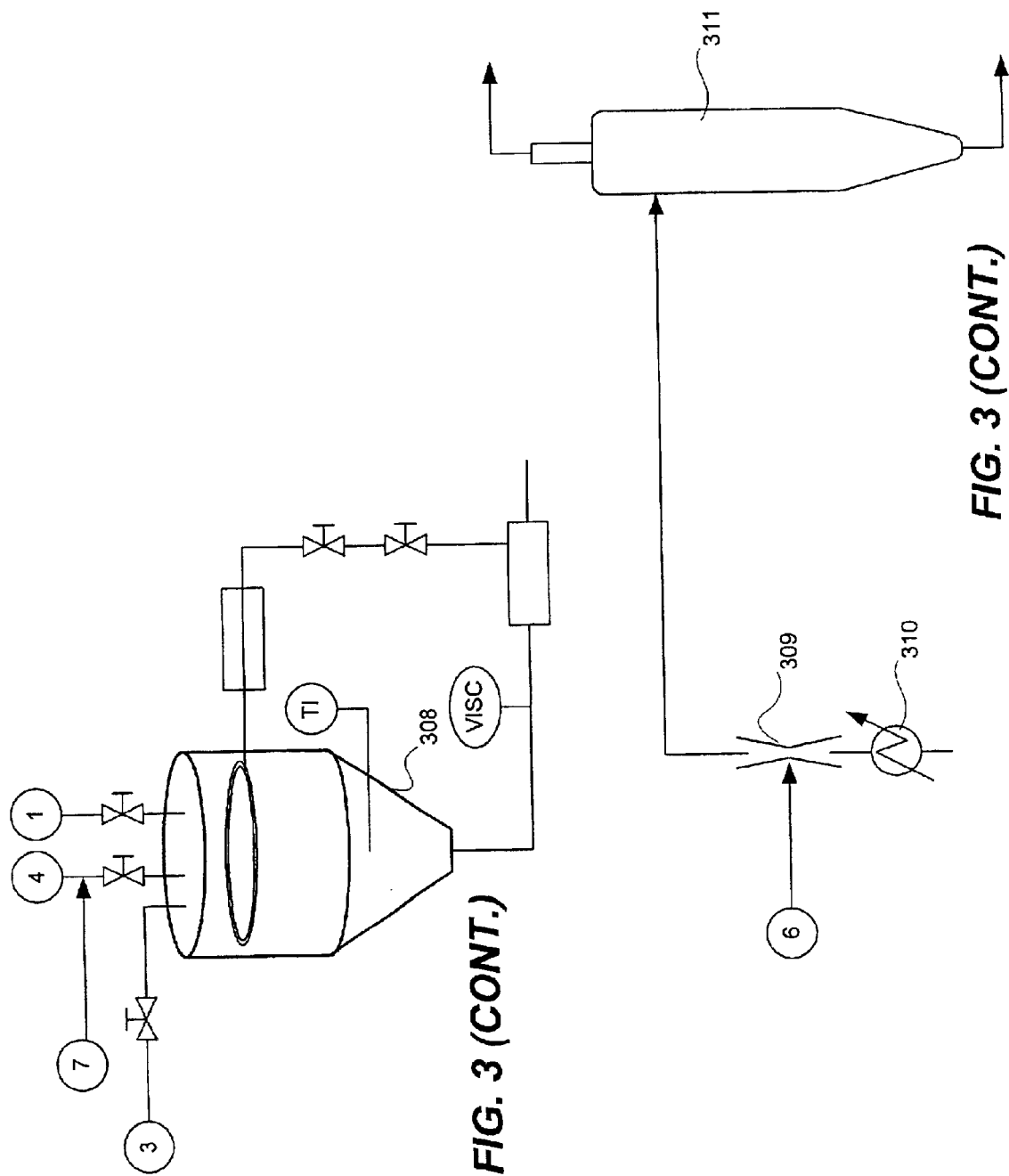

PRECURSORS OF ENGINEERED POWDERS

RELATED APPLICATIONS

The present invention claims priority to U.S. Provisional Application No. 60/267,653 Filed on Feb. 12, 2001 entitled "ORGANOMETALLICS AND NANO-ENGINEERED POWDERS", the specification of which is incorporated herein by reference in its entirety.

BACKGROUND OF THE INVENTION

1. Field of the Invention

The present invention relates, in general, to precursors useful in making fine powders, and, more particularly, methods to produce precursors, particularly organometallic precursors, and fine powders.

2. Relevant Background

Powders are used in numerous applications. They are the building blocks of electronic, telecommunication, electrical, magnetic, structural, optical, biomedical, chemical, thermal, and consumer goods. On-going market demands for smaller, faster, superior and more portable products have demanded miniaturization of numerous devices. This, in turn, demands miniaturization of the building blocks, i.e. the powders. Sub-micron and nano-engineered (or nanoscale, nanosize, ultrafine) powders, with a size 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors where conventional coarse-grain physiochemical mechanisms are not applicable, these materials offer unique combination of properties that can enable novel and multifunctional components of unmatched performance. Yadav et al. in a co-pending and commonly assigned U.S. patent application Ser. No. 09/638,977 which along with the references contained therein are hereby incorporated by reference in full, teach some applications of sub-micron and nanoscale powders.

Some of the greatest challenges in the cost-effective production of powders involve controlling the size of the powders as well as controlling the composition of the powder. Precursor properties are significant contributors to these powder characteristics.

Precursors for nano-engineered powders are needed to manufacture superior quality nanomaterials cost-effectively and in volume. Precursors significantly impact the economics of a process and quality of products formed. A number of different high temperature processes based on different precursors have been proposed for the synthesis of nanoscale powders. For example, U.S. Pat. No. 5,514,349 (incorporated by reference herein), teaches the use of solid conducting electrode precursors to produce metal and ceramic powders. One difficulty with this approach is the cost and conductivity of the electrode. Furthermore, this process limits the ability to produce complex compositions because the composition of the product is directly dependent on the composition of the electrode. A wide variety of solid precursor electrodes are not readily available, and many desirable products do not have any corresponding electrode.

As another example, it is known to those in the art that halides such as titanium chlorides and gaseous metal-containing precursors such as diethyl aluminum and silane are precursors for powder production. These precursors can be used as precursors for high temperature processes to produce submicron and nanoscale powders. Similarly, U.S. Pat. No. 5,876,683 (incorporated herein) teaches the use of these and similar gaseous precursors to produce nanoscale powders.

These precursors create the challenge of post-treatment of byproducts such as chlorine, which can increase process complexity and cost. The product quality may also suffer because of chloride contamination. Another limitation is that processing equipment must be configured to handle the corrosive intermediates and byproducts, hence, the processing equipment tends to be expensive, require more frequent maintenance, and/or have short useful lifetimes.

Yet another limitation of such processes is the hazard and operability of the system as these precursors can undergo spontaneous reaction with other species involved in the process. Similarly, because many species spontaneously react with air or water, vapor which may be involved in the manufacturing process or simply present in the manufacturing facility, handling and use becomes both problematic and expensive. Finally, another limitation of these high temperature processes is the general need to gasify the feed before it is added to oxygen, which requires additional processing equipment, additional cost, and creates more opportunity for variability and contamination in the production process.

Another approach to precursor selection has been to use high molecular weight chelate-type polymeric precursors (e.g. see U.S. Pat. No. 5,958,361 herein incorporated by reference in full). These precursors have also been used in a high temperature process to produce simple and complex oxide powders. However, these precursors are expensive to produce and have secondary byproducts. The nitrogen or halides in these precursors or their equivalent face many of the same challenges as above. The high molecular weight correlates with to high viscosity which can affect the size distribution of the powder produced.

Other approaches involve feeding solid powders into a high temperature process in order to break them down to smaller sizes. In these approaches it may be difficult to control size distribution and significant agglomeration of the particles. Moreover, the variety of powders that can be produced is constrained by the availability of appropriate starting powders. To the extent the larger starting powders are produced by similar processes described above, this technique incorporates many of the limitations described above as well.

In general, processes available until now are limited by the choice of the precursor they utilize. There is a need for a process that utilizes low-cost, readily available precursors to produce high quality nanoscale powders. Moreover, there remains a need for precursors for powder production that are environmentally benign and require minimal pre-processing costs in high volume.

SUMMARY OF THE INVENTION

Briefly stated, the present invention involves the production and selection of precursors used to produce fine powders of oxides, carbides, nitrides, borides, chalcogenides, metals, and alloys. Methods for making fine powders using the selected precursor include selecting a precursor mixture wherein the mixture comprises at least one metal containing precursor, the metal containing precursor has an average molecular weight of less than 2000 g/mol of the metal, the metal containing precursor has a normal boiling point greater than 350K, and the viscosity of the precursor mixture is between 0.1 to 250 cP. The precursor mixture is processed under conditions that produce the fine powder from the precursor mixture. Fine powders produced are of size less than 100 microns, preferably less than 10 micron, more preferably less than 1 micron, and most preferably less than 100 nanometers. Methods for producing such precursors and powders in high volume, low-cost, and reproducible quality are described.

DETAILED DESCRIPTION OF THE PREFERRED EMBODIMENTS

Figure 2:
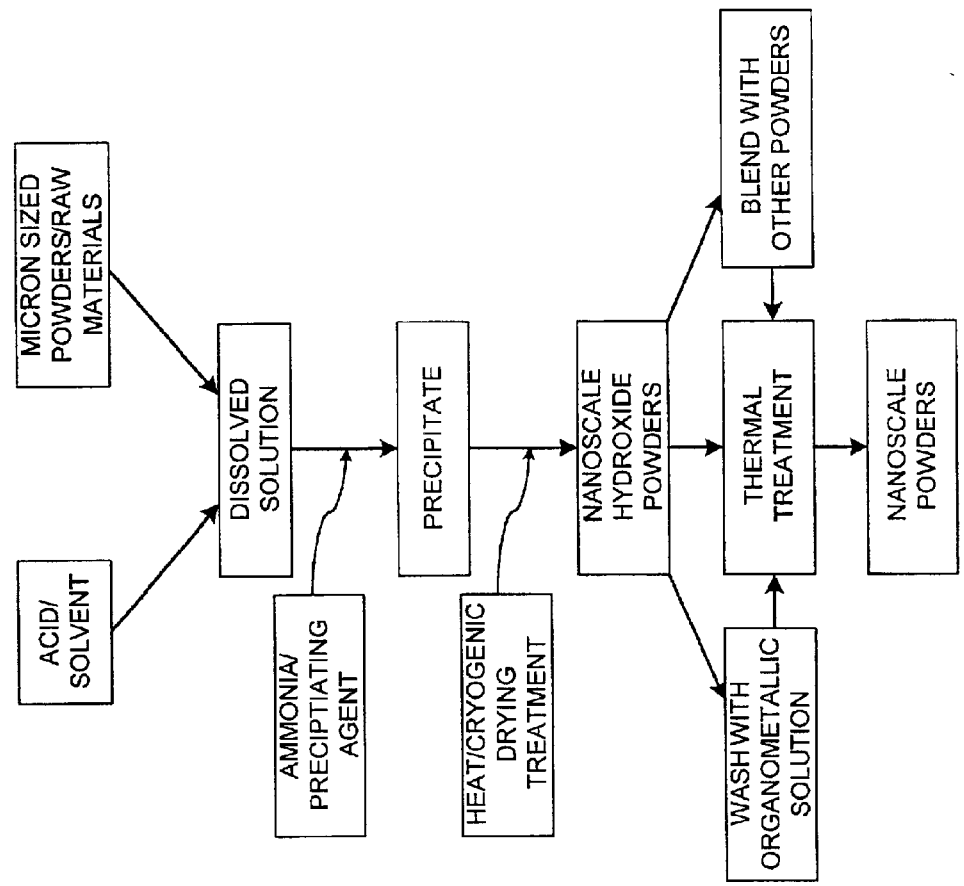
FIG. 2 shows an exemplary overall approach for producing fine powders in accordance with the present invention.

This invention is generally directed to very fine powders of oxides, carbides, nitrides, borides, chalcogenides, metals, and alloys. The scope of the teachings include high purity powders. Fine powders discussed are of size less than 100 microns, preferably less than 10 micron, more preferably less than 1 micron, and most preferably less than 100 nanometers. Methods for producing such powders in high volume, low-cost, and reproducible quality are also outlined.

DEFINITIONS

For purposes of clarity the following definitions are provided to aid understanding of description and specific examples provided herein:

"Fine powders", as the term used herein, are powders that simultaneously satisfy the following:

1. particles with mean size less than 100 microns, preferably less than 10 microns, and
2. particles with aspect ratio between 1 and 1,000,000.

"Submicron powders", as the term used herein, are fine powders that simultaneously satisfy the following:

1. particles with mean size less than 1 micron, and
2. particles with aspect ratio between 1 and 1,000,000.

"Nanopowders" (or "nanosize powders" or "nanoscale powders"), as the term used herein, are fine powders that simultaneously satisfy the following:

1. particles with mean size less than 250 nanometers, preferably less than 100 nanometers, and
2. particles with aspect ratio between 1 and 1,000,000.

"Pure powders," as the term used herein, are powders that have composition purity of at least 99.9%, preferably 99.99% by metal basis.

"Precursor," as the term used herein encompasses any raw substance, preferably in a liquid form, that can be transformed into a powder of same or different composition. The term includes but is not limited to organometallics, organics, inorganics, solutions containing organometallics, dispersions, sols, gels, emulsions, or mixtures.

"Organometallic," as the term used herein is any organic substance that contains at least one metal or semi-metal.

"Powder", as the term used herein encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized stoichiometric, and non-stoichiometric form or substance.

This invention is specifically directed to precursor mixtures for forming fine powders, including submicron and nanoscale powders. In generic sense, the invention teaches a precursor mixture for forming submicron and nanoscale powders comprising (a) at least one metal containing species, (b) an average heat of combustion greater than 1 KJ/liter, preferably greater than 10 KJ/liter, (c) a viscosity at 298 K between 0.1 cP and 250 cP, preferably between 0.25 cP and 100 cP, (d) a stability greater than 5 seconds, (e) the said metal containing species has a molecular weight less than 2000 g/mol, preferably less than 500 g/mol, (f) a normal boiling point (at 1 atmosphere) greater than 350K, preferably greater than 375K, and (g) where the metal concentration in the said precursor solution is greater than 5.5% by weight, preferably greater than 22% by weight. This precursor mixture may further comprise additives such as but not limiting to water, naphtha, toluene, benzene, hexane, acetic acid, oxalic acid, kerosene, gasoline, methanol, ethanol, isopropyl alcohol, glycerol, polyol, and petrochemicals.

Figure 1:
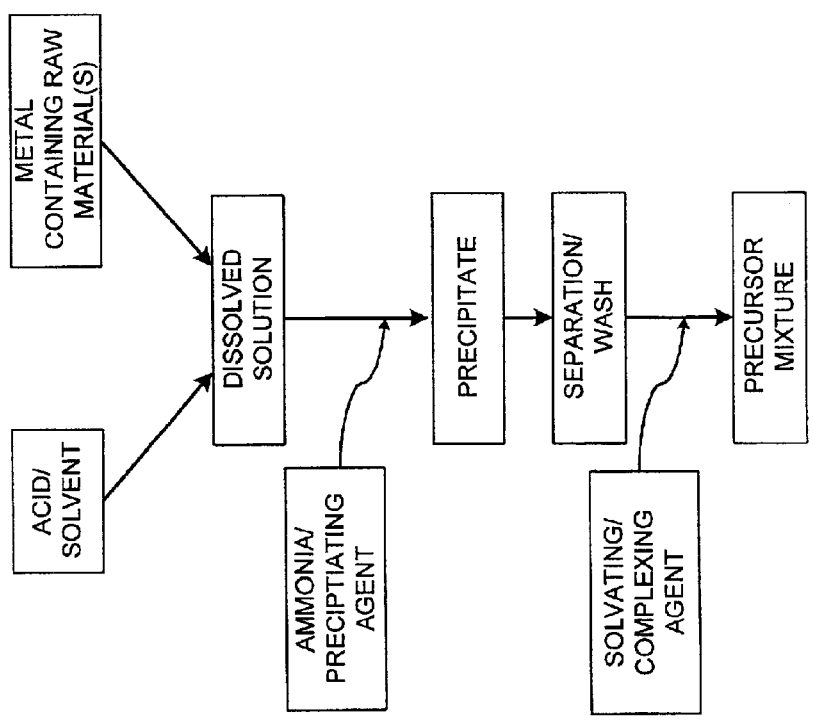
FIG. 1 shows an exemplary overall approach for producing organometallic precursors in accordance with the present invention.

FIG. 1 shows an exemplary overall approach for the production of precursors mixtures or solutions. This method is particularly useful for producing organometallic precursors for sub-micron and nanoscale powders. The process shown in FIG. 1 begins with a metal containing raw material (for example but not limiting to coarse oxide powders, metal powders, salts, slurries, waste product, organic compound or inorganic compound). In this invention, a raw material is preferred using the following criterion—cost is low per unit metal basis, high stability, environmentally and ecologically benign, and available in high volumes. The metal containing raw material is dissolved in a suitable solvent such as an acid. The concentration of the dissolved solution is preferably monitored to ensure that concentration is within desired parameters for a particular implementation.

In a preferred embodiment, the dissolution step results in a dilute solution. If required, the dissolved solution is diluted with demineralized water (or any other suitable solvent) to concentrations less than 0.25 mols per liter, preferably less than 0.025 mols per liter, and most preferably less than 0.0025 mols per liter. In one embodiment, dopants may be added at this stage to produce complex organometallics. In another embodiment, other solutions of dilute metal containing dissolved solutions may be added at this stage. The temperature of dissolution media is preferably selected to balance or optimize the acceleration of the dissolution step while minimizing the energy costs.

The dissolved solution is then treated with a precipitating agent to form a metal containing precipitate. It is preferred that the precipitating agent be added slowly to the dissolved solution. Alternatively, it is preferred that the precipitating agent is dilute. The temperature of the solution is preferably controlled to optimize the precipitate characteristics. Lower temperatures reduce the reaction and diffusion rates. An important goal of this step is that the diffusion rate of reactants at the precipitation interfaces is slower than the mixing rate of the precipitates in the solution bulk, preferably less by a factor of 2.5. This addition step may occur in a continuously stirred mixed tank reactor or in a plug flow reactor or in any equipment that enables the control of precipitation and mixing rates.

For example, in one embodiment, if the pH of the dissolved solution is less than 7.0, ammonium hydroxide may be added to form the metal containing hydroxide precipitate. This precipitates a hydroxide from the dissolved solution.

The precipitate formed is filtered using a filter press. In another embodiment, the precipitate containing solution is centrifuged to remove the solids from the liquids. In yet another embodiment, the precipitate is settled using gravity and then decanted. Any other method of solid liquid separation may be utilized at this stage to obtain the filtered precipitate.

The filtered precipitate is washed with demineralized water or any other suitable solvent or solvent combinations as many times as desired. The objective at this stage is to remove any acid, dissolved solution, or alkali from the precipitate surface. It is preferred if the extent of washing needed is monitored by a suitable instrument such as a pH meter.

The washed precipitate is then added to a solvating or complexing agent. This agent is preferably chosen for its ability to react with the precipitate to produce an organometallic fluid. The addition step may be performed in a stirred tank reactor or a plug flow reactor or any other suitable reactor. The organometallic precursor may be removed as it is formed to accelerate the salvation step. If the precipitate is mixed in the reactor, the mixing can be achieved using a stirrer, sparging system, solvating agent recycle system, jet mixing, and other methods. The temperature of the mixing step may be controlled to accelerate the synthesis step or to avoid secondary reactions. Suitable catalysts may be employed at this stage.

As a non-limiting example, 2 ethylhexanoate may be used as this solvent reacts with the hydroxide functional group and produces an organometallic. Other illustrations can utilize any suitable organic acid capable of reacting with the hydroxide precipitate. This step yields an organometallic precursor.

The precursor mixture can be produced using any reaction pathway and using any process equipment and instrumentation. However, the scope of this invention is limited to precursors useful to the production of nanoscale or submicron nanoparticles. These precursors can be used in any method for producing nanoscale or fine powders. Illustrative methods include commonly-owned issued U.S. Pat. Nos. 5,788,738, 5,851,507, 5,984,997, and co-pending application Ser. Nos. 09/638,977 and 60/310,967, all of which along with references therein are incorporated herewith in full.

The precursor may be a mixture. It is preferred that the mixture be homogeneous and that this precursor mixture be stable, i.e., homogeneity remains acceptable for a duration greater than the feed residence time in the process it is being used. As a rule of thumb, a stability greater than 5 seconds is preferred, a stability greater than 5 minutes is more preferred, and a stability greater than 5 hours is most preferred.

The precursor solutions (or mixtures) within the scope of the invention preferably have an exothermic heat of reaction with oxygen or oxygen containing feed gases. It is preferred that the precursor solution should generate enough thermal energy during its chemical reaction with oxygen or oxygen containing feed gases that it can lead to a self-sustained chemical reaction at an average temperature above the boiling point (at 0.1 atmospheres) of lowest boiling species in the precursor mixture. More specifically, the heat released during the precursor mixture's reaction with oxygen is on average greater than 1 kJ per liter of the precursor mixture, preferably greater than 10 kJ/liter, more preferably greater than 25 kJ/liter, and most preferably 75 kJ/liter.

The precursor solutions (or mixtures) within the scope of the invention have low vapor pressures at 298 K. More specifically, the normal boiling point of the metal containing precursor (i.e., at 1 atmosphere) is on average greater than 350K, preferably greater than 375K, more preferably greater than 400K, and most preferably 425K.

The precursor solutions (or mixtures) within the scope of this invention have a viscosity that makes them easy to feed. More specifically, the viscosity of the precursor mixture at 298K is on average between 0.1 to 250 cP, preferably between 0.25 to 150 cP, more preferably between 0.5 to 100 cP, and most preferably between 0.75 to 75 cP. The viscosity is established in a range such that the precursor mixtures are neither gas, nor solid.

The precursor solutions (or mixtures) within the scope of the invention have high metal concentration by weight for high production rates and productivity. More specifically, the metal content in the precursor mixture is greater than 5.5 weight percent, preferably greater than 11 weight percent, more preferably greater than 22 weight percent, and most preferably greater than 33 weight percent.

To further particularly define the invention, the precursor solutions (or mixtures) within the scope of the invention comprise at least one metal containing species. More specifically, the average molecular weight of the metal precursor per unit mol of metal (or metals) in the precursor is less than 2000 g/mol, preferably less than 1000 g/mol, more preferably less than 800 g/mol, and most preferably less than 600 g/mol. In some embodiments, where the mols of metal in the precursor are not readily determinable, this invention prefers an average molecular weight of the metal precursor, comprising at least one metal, less than 2500 g/mol, preferably less than 1500 g/mol, more preferably less than 1000 g/mol, and most preferably less than 750 g/mol. In some embodiments, the metal containing precursor molecule may comprise of more than one metal in its molecular structure. In such cases, it is preferred that the precursor have less than or equal to six same metallic elements, more preferably less than or equal to four same metallic elements, and most preferably less than or equal to two same metallic elements in its molecular structure.

Depending on the end use of the organometallic precursor, other treatments may be performed on the precursor. To illustrate, but not limit, a precursor with characteristics outlined above can be mixed with other precursors with similar characteristics to produce complex multi-metal compositions. Alternatively, solvents such as but not limiting to alcohols, acids, hydrocarbons, or oils may be added to dilute the concentration or to change the viscosity or density of the organometallic precursor. Additionally, stabilizing agents may be added to increase the storage and shelf lifetime for the organometallic precursor.

The precursors with preferred embodiments discussed above may be processed into powders by, for example, reacting the precursor with oxygen or a gas comprising oxygen to form oxides, nitrogen, ammonia or a gas comprising nitrogen to form nitride, methane or a gas comprising carbon to form carbide, borane or a gas comprising boron to form boride, hydrogen or a gas comprising a reducing gas to form metal or suboxides. Other inorganic nanoparticles may similarly be formed by reacting the precursors with suitable gases.

FIG. 2 shows an exemplary overall approach for the production of fine powders in general and nanopowders in particular. The process shown in FIG. 2 begins with a metal containing raw material (for example but not limiting to coarse oxide powders, metal powders, salts, slurries, waste product, organic compound or inorganic compound). The metal containing raw material is dissolved in a suitable solvent such as an acid (e.g. nitric acid) The concentration of the dissolved solution is checked to ensure that it is not too concentrated. In a preferred embodiment, the dissolution step results in a dilute solution. If required, the dissolved solution is diluted with demineralized water (or any other suitable solvent) to concentrations less than 0.5 mols per liter, preferably less than 0.05 mols per liter, and most preferably less than 0.005 mols per liter. For smaller particle sizes, lower concentration is normally preferred. However, higher concentrations are preferred when higher supersaturation is desired or when energy costs are to be lowered.

The solvent composition for dissolution is chosen that reduces the diffusion rate of reacting species in the solution (for example, alcohols such as ethanol may be added to water to tailor the mass transfer and momentum transfer characteristics of the solution). In one embodiment, dopants may be added at this stage to produce complex nanopowders. In another embodiment, other solutions of dilute metal containing dissolved solutions may be added at this stage. The temperature of dissolution media is optimized in one embodiment to accelerate the dissolution step while minimizing the energy costs.

The dissolved solution is then treated with a precipitating agent to form a metal containing precipitate (i.e., a sol). It is preferred that the precipitating agent be added slowly to a large volume of the dissolved solution (the ratio of the large volume to small volume being greater than 2). In another embodiment, it is preferred that the precipitating agent be dilute. The concentration of the precipitating agent should be higher than that required thermodynamically for the precipitate to form.

In another embodiment, the dissolved solution is added slowly to a large volume of the precipitating agent (the ratio of the large volume to small volume being greater than 2). This is particularly useful when a homogeneous multi-metal precipitate is desired. Once again, the concentration of the precipitating agent should be higher than that required thermodynamically for the precipitate to form.

The temperature of the solution is preferably controlled to optimize the precipitation characteristics. Lower temperatures reduce the reaction and diffusion rates. The key aspect of this step is that the diffusion rate of reactants at the precipitation interfaces be slower than the dispersion rate of the precipitates in the solution bulk, preferably less by a factor of 2.5. It is preferred if the solution concentrations and processing conditions are varied to decrease the precipitate growth rate while increasing the precipitate nucleation rate. It is also preferred if the processing parameters are varied using an on-line instrument that monitors the precipitate size distribution (e.g. laser scattering). This addition step may occur in a continuously stirred mixed tank reactor or in a plug flow reactor or in any equipment that enables the control of precipitation and mixing rates. An eductor, that is a venturi system, is preferred for the mixing of dissolved solution and the precipitating agent solution. One of the solutions is fed at high pressure to the converging section of the venturi system. The flow causes a low pressure to develop in the throat of the venturi which is utilized to introduce the other solution at the throat. The mixed product then exits the diverging section of the venturi.

In another embodiment, it is preferred that a plug flow system be used. A plug flow eliminates axial mixing and thereby can yield narrow size distribution nanopowders (monosize powders). The design principle preferred for the design of plug flow reactor system is given by:

$$UL/D > \beta$$

Where,

U: axial velocity
L: axial length of the reactor
D: axial dispersion coefficient
β: plug flow index (preferably equals 5, more preferably equals 50, and most preferably equals 500)

In order to increase the axial velocity, everything else remaining same, one may decrease the diameter (or cross section) of the reactor. In order to reduce axial dispersion coefficient, one may vary numerous variables such as temperature or presence of substances that affect the dispersion coefficient.

Illustrations of precipitating agent include ammonium hydroxide, ammonia, alkalis, hydrogen peroxide, and weak bases to form the metal containing hydroxide precipitate. This precipitates a hydroxide from the dissolved solution. Alternatively, gas-liquid reaction apparatus may be utilized to react a gas phase precipitating agent (for example, ammonia vapors). In yet another embodiment, electrical current or electromagnetic fields or photons may be utilized to facilitate or optimize precipitation.

The precipitate formed is filtered using a filter press assisted with or without vacuum. In another embodiment, the precipitate containing solution is centrifuged to remove the solids from the liquids. In yet another embodiment, the precipitate is settled using gravity and then decanted. Any other method of solid liquid separation may be utilized at this stage to separate the filtered precipitate.

The separated filtered precipitate is washed with demineralized water or any other suitable solvent or combinations thereof as many times as necessary. The objective at this stage is to remove any acid, dissolved solution, undesired co-precipitated salts or alkali from the precipitate surface. The preferred solvent would reduce agglomeration and remove the liquid without further precipitation of any solid between the precipitate particles. Illustration of such solvents include those that have low surface tension (e.g. alcohols, ketones, aldehydes, aromatics, aliphatic solvents, mixtures). During the washing step, mixing or milling may be employed to dislodge the liquid adhering to the particles and between the particles because of capillary forces. Furthermore, low pressure drying steps (such as with spray dryers or cryogenic drying) with or without convective gas flow may be employed between the wash steps to assist removal of the interface liquid. It is preferred if the extent of washing needed is monitored on-line by a suitable instrument such as a pH meter.

In one embodiment, the washed precipitate is calcined in air at a temperature sufficient to convert the hydroxide into an oxide. In another embodiment, the calcination environment is changed to oxygen rich environment or to hydrogen rich environment or to carbon rich environment or to nitrogen rich environment to produce stoichiometric oxides, non-stoichiometric oxides (reduced oxide) or metals, carbides and nitrides respectively.

The calcination temperature is preferably determined as follows-the precipitate is processed in a thermogravimetric analyzer in line with a mass spectrometer (TGA-MS) where the weight loss as a function of temperature is monitored along with the composition of the species formed during the said weight loss. The preferred calcination temperature is the highest temperature above which (a) the rate of weight loss is always less than 5%, preferably 1% and most preferably 0.1%; and (b) the change of composition for any species is always less than 5%, preferably 1% and most preferably 0.1%. In case of multiple temperatures, the lowest temperature is preferred. The calcination temperature is preferably less than 0.5 times the melting point of the precipitate or the final product. While these guidelines are useful for many applications, the guidelines should be relaxed whenever the product formed at a lower temperature meets the needs of the desired user application. Finally, it should be noted that the guidelines may also be relaxed to reduce energy costs.

The calcination temperature may be reached using various temperature ramping methods. It is preferred to use an optimum ramp that reduces energy cost and processing time while maximizing the product quality. The heating environment may be changed during the ramp cycle to tailor the properties of the powders produced.

The calcination step may be carried out in any equipment. Some non-limiting illustrations include rotary kiln, fluidized bed, co-current or counter current spray reactor, spouted reactor, tray type reactor, pneumatic conveyor with recycle, thermal processors, and furnace. The calcination may also be done using microwave ovens and furnaces for rapid heating cycles.

In another embodiment, the washed precipitate is washed with an organometallic solution before the calcination step elaborated above. For example, one may utilize the organometallic precursor solution resulting from the process outlined in FIG. 1. Alternatively, commercially available organometallics such as titanates and zirconates (e.g. TYZOR®), alkoxides, chelates, alkyls, metallocenes, and other compositions may be utilized. The preferred organometallic is one that (a) reacts with the precipitate's surface hydroxide functional group and forms a monolayer on the surface; (b) the presence of surface layer of another metal enhances the powder's performance or at least does not adversely affect the performance of the powder; (c) reduces formation of hard agglomerates during calcination; and (d) is affordable. If desired, the precipitate after organometallic solution treatment may be filtered, washed and/or dried before calcination.

As a non-limiting example, 1 ml TYZOR® TOT® (from DuPont®) in 100 ml isopropanol is a specific illustration of an organometallic solution for wash purposes.

In yet another embodiment, dopants preferably nanodopants or other precipitate powders are added to the filtered and washed precipitate before the calcination step. It is preferred if the powders are well mixed using mechanical or other means.

This invention can also be utilized to produce pure powders. In this case, the dissolved solution or the precipitate obtained and shown in FIG. 2 is purified using one of the many techniques known for purification of liquids and solids. Some non-limiting illustrations include electrochemical purification, sequential crystallization methods, extraction purification, distillation purification, chromatographic purification, membrane purification, and sublimation purification.

The calcination step yields the desired nanopowders. The calciner may be heated electrically or with natural gas or other available heat sources. In a preferred embodiment, the calcined powders are homogenized, sieved, and/or blended in-situ or post-calcination to ensure acceptability and uniform quality of the powders for a given application. If desired, a dispersion such as ink or paste may be made inside the calcination reactor by adding appropriate solvents and dispersants. The nanopowders can be removed from the calcination equipment using a number of methods. Some non-limiting examples include pneumatic conveying, screw conveying, venturi type eductor remover, or pumping. In case the nanopowders are removed using a gas conveying method, the powders can be removed near a packaging unit with a high efficiency membrane containing filter or cyclone.

The packaging of the nanoscale powders into suitable may be done using auger filler based packaging system or any powder packaging equipment. The packaging environment may be an inert or air. The packaging container may be made of an multilaminate or single layer, metallic or glass or plastic, rigid or flexible, insoluble or soluble material for ease of handling in ultimate application. Adequate labels and stamping may be done on the packaging material for safety, handling instructions, quality information, re-ordering information, laser or radio chip markers for logistics, and may include any desired marketing and other information. It is preferred if the packaging unit allows ease of use while maximizing safety and exposure prevention.

A coating, film, or component may also be prepared by dispersing the fine nanopowder and then applying various known methods such as but not limiting to electrophoretic deposition, magnetophorectic deposition, spin coating, dip coating, spraying, brushing, screen printing, ink-jet printing, toner printing, and sintering. The nanopowders may be thermally treated or reacted to enhance its electrical, optical, photonic, catalytic, thermal, magnetic, structural, electronic, emission, processing or forming properties before such a step.

It should be noted that the intermediate or product at any stage in FIG. 2, or similar process based on modifications by those skilled in the art, may be used directly as feed precursor to produce nanoscale or fine powders by methods such as but not limiting to those taught in commonly owned U.S. Pat. Nos. 5,788,738, 5,851,507, 5,984,997, and co-pending application Ser. Nos. 09/638,977 and 60/310,967. For example, a sol may be blended with a fuel and then utilized as the feed precursor mixture for thermal processing above 2500 K to produce nanoscale simple or complex powders.

EXAMPLE 1

Yttrium Oxide Powders $Y(NO_3)_3.6H_2O$ [5.9 g] was weighed and dissolved in demineralized water. Total volume of solution was 150 ml. To precipitate $Y(OH)_3$, $NH_4OH$ was used as precipitating agent. $NH_4OH$ was diluted in demineralized water (20 ml in 200 ml of solution). 35 ml of NH4OH solution was added to the $Y(NO_3)_3$ solution slowly over 15 min. This raised the pH of the solution to 9.5. The precipitate was stirred for 20 min to ensure pH equilibrium. The precipitate was filtered under vacuum and washed with 200 ml of demineralized water twice. The powder was then calcined at 750 C. by ramping the temperature rise at 10 C./min. The calcination was done for 30 minutes. The nanopowder produced had an XRD crystallite size of 15–17 nm and a BET surface area of 72.5 $m^2/gm$. This example shows that oxide nanopowders can be produced.

EXAMPLE 2

Yttrium Oxide Powders $Y(NO_3)_3.6H_2O$ [5.9 g] was weighed and dissolved in demineralized water. Total volume of solution was 150 ml.

To precipitate Y(OH)$_3$, NH$_4$OH was used as precipitating agent. NH$_4$OH was diluted in demineralized water (20 ml in 200 ml of solution). 35 ml of NH4OH solution was added to the Y(NO3)3 solution slowly over 15 min. This raised the pH of the solution to 9.5. The precipitate was stirred for 20 min to ensure pH equilibrium. The precipitate was filtered under vacuum and washed with 200 ml of demineralized water twice. The powder was then calcined at 675 C. by ramping the temperature rise at 10 C./min. The calcination was done for 30 minutes. The nanopowder produced had an XRD crystallite size of 13–14 nm and a BET surface area of 81.3 m$^2$/gm. This example shows that calcination temperature can be utilized to tailor the powder characteristics.

EXAMPLE 3

Yttrium Oxide Powders

Y(NO$_3$)$_3$.6H$_2$O [5.9 g] was weighed and dissolved in demineralized water. Total volume of solution was 150 ml. To precipitate Y(OH)3, NH$_4$OH was used as precipitating agent. NH$_4$OH was diluted in demineralized water (20 ml in 200 ml of solution). 35 ml of NH4OH solution was added to the Y(NO3)3 solution slowly over 15 min. This raised the pH of the solution to 9.5. The precipitate was stirred for 20 min to ensure pH equilibrium. The precipitate was filtered under vacuum and washed with 200 ml of demineralized water twice. After filtration the precipitate was washed with an organometallic solution (1 ml Tyzor TOT diluted to 50 ml with anhydrous isopropanol). Then it was filtered again, dried in oven at 120° C. and ground. The powder was then calcined at 750 C. by ramping the temperature rise at 10 C./min. The calcination was done for 30 minutes. The nanopowder produced had an XRD crystallite size of 11 nm and a BET surface area of 99.7 m$^2$/gm. This example shows that washing with organometallic solution is an unusual way to tailor the powder characteristics even when high calcination temperature are used or necessary.

EXAMPLE 4

Aluminum Oxide Powders

Aluminum isopropoxide was used as the raw material. It is affordable and easy reacts with nitric acid to produce soluble aluminum nitrate. In 1 L beaker 500 ml of demineralized water was added. To this, 100 ml (142 g) of HNO3 was added and stirred for about 20 min. Next, 60 g of Al-isopropoxide (20 g at a time) was added to the nitric acid solution. Clear solution was formed in about 30 min. This solution was then used for further experiments.

200 ml Al(NO3)3 solution was diluted with 500 ml of demineralized water. For precipitating agent, 20 ml of concentrated NH$_4$OH was added to 200 ml water solution. Under constant stirring, 220 ml of NH$_4$OH solution was added to 200 ml of aluminum nitrate solution drop by drop over 2 hours. The solution was stirred additional 20 min to ensure pH equilibrium. The precipitate was filtered using Buchner funnel. The filter was then rinsed with deionized (DI) water twice. The precipitate was dried at 120 C. for 12 hours. The surface area of the precipitate after drying was over 250 m$^2$/gm with XRD grain size of 2 to 3 nm. The powder was next calcined at 550 C. for 5 hours using a ramp of 10 C./min. The BET of the powder was still over 250 m$^2$/gm. Calcining the powder to 950 C. for 1 hour yielded delta alumina nanopowders with surface area of 128 m$^2$ /gm.

EXAMPLE 5

Aluminum Oxide Powders

The same procedure as in Example 4 was followed. The precipitate after the filtration step was collected into a beaker and washed with an organometallic solution (150 ml of IPA with 3 ml Tyzor TOT in it). The precipitate was dried at 120° C. and then ground. The powder was then calcined at 950 C. for 1 hour (10 C./min ramp) yielded alpha alumina nanopowders with surface area of 89.0 m$^2$/gm. Some titania was also detected during XRD. This example illustrates that the phase of alumina formed can be tailored using organometallic wash step. The example also illustrates the manufacture of titania doped alumina (which is useful in high voltage components).

EXAMPLE 6

Ceria Powders 10 g of (NH$_4$)2Ce(NO$_3$)6 were dissolved in 400 ml of DI water. Then slowly, under constant stirring 25 ml of NH4OH solution (20 ml of conc. NH4OH in 200 ml of total solution) was added, until the solution reached pH 8.5–9. Purple-gray precipitate was formed. The suspension was stirred for about 20 min. to equilibrate pH. The precipitate was filtered using a Buchner funnel. The filter-cake was rinsed with DI water twice. The "dry-looking" filter cake was transferred into crucible and calcined at 900° C. for 1 h, ramp −10° C./min. The ceria powder formed had an XRD size of 64 nm and a surface area less than 1 m$^2$/g.

EXAMPLE 7

Ceria Powders 15 g of Ce(NO$_3$)3×6H$_2$O were dissolved in 800 ml of DI water. Then the same precipitation procedure as in Example 6. The light purple precipitate was separated by letting it settle down and slowly decanting the water from the top as much as possible. Next the remaining suspension was filtered and rinsed with DI water. The precipitate was dried at 100–110° C. for about 12 hours. The powder turned yellow. The powder was then ground. The powder was found to have a particle size of 10–12 nm (XRD) and was ceria. The BET surface area was 108 m$^2$/g. In this case calcination was not needed. However, thermal treatment was done using a TGA at 900° C. for 1 h, ramp −10° C./min to determine the thermal effect on the powder. The powder grew to a size of 38–67 nm per XRD and the surface area reduced to about 9 m$^2$/g. This example illustrates the importance of starting material and the fact that calcination is sometimes not necessary.

EXAMPLE 8

Ceria Powders

In this experiment, we started with 20 g of Ce(NO$_3$)3×6H$_2$O in 1000 ml of DI water. Then the same procedure as Example 6 was used. However, in this case the pH was brought to between 10–11 with addition of more precipitating agent and the precipitate powder was then treated with an organometallic solution. 100 ml of organometallic solution (1 ml of Tyzor in about 100 ml of isopropanol) was added to the powder. The powder was stirred to produce a dispersion. The dispersion was filtered and dried at 100–110° C. The powder was then ground and analyzed. The XRD size was found to be 8–9 nm and the surface area was observed to be about 170 m$^2$/gm. The powder was then calcined at 500 C. for 1 hour (ramp of 10 C./min) to observe the stability of the nanopowder. The powder was found to be about 8–14 nm after the thermal treatment and with the surface area of about 123 m$^2$/gm. Further thermal treatment to 800 C. was done and it was found that the ceria powder is still about 8–11 nm in size. This example illustrates that organometallic wash can significant impact the mean particle size of nanopowders and the thermal stability of nanopowder at temperatures as high as 800 C.

EXAMPLE 9

Precursors and Powders

In production runs various types of feeds are used to produce nanoscale powders. The feed precursor mixtures were fed into a process described in U.S. Pat. No. 5,788,738 and co-pending patent application Ser. Nos. 09/638,977 and 60/310,967. In these processes, the precursor mixture is fed into a thermal reactor under conditions that favor nucleation, then thermally quenched. The selected precursor mixtures described herein are substituted for the gas-suspended solid precursors described in the referenced patents and patent applications. Table 1 outlines exemplary precursor mixtures used and the powder product produced. These precursor mixtures meet the requirements explained in detail earlier.

TABLE 1

| Feed Precursor Mixture | Viscosity | Average Approx. Mol Wt of each metal containing species per mol of metal atom in the species | Product |
|---|---|---|---|
| Zirconium Acetate + Water + Isopropyl Alcohol | 7–15 cP | 164 gms/mol Zr | Zirconia |
| Zirconium HEX-CEM ™ | 20–30 cP | 506 gms/mol Zr | Zirconia |
| Zirconium HEX-CEM ™ + Octamethyl-cycletetra-siloxane | 2–10 cP | 506 gms/mol Zr 74 gms/mol Si | Zirconium Silicates |
| AOC ™ + Octamethyl-cycletetra-siloxane | 24–35 cP | 385 gms/mol Al 74 gms/mol Si | Aluminum Silicates |
| Barium Plastistab ™ + AOC ™ + Octamethyl-cycletetra-siloxane | 20–30 cP | 397 gms/mol Ba 385 gms/mol Al 74 gms/mol Si | Barium Aluminum Silicates |
| Yttrium 2-EH + Zirconium HEX-CEM ™ | 25–40 cP | 506 gms/mol Zr 1893 gms/mol Y | Yttria Stabilized Zirconia |
| Zn HEX-CEM ™ + Naphtha | Less than 100 cP | 361 gms/mol Zn | Zinc Oxide |
| Cerium HEX-CEM ™ + Naphtha | Less than 100 cP | 350 gms/mol Ce | Cerium Oxide |

USES

Once the precursor is available, they may be used in any number of applications including the production of nanopowders by methods such as, but not limited to, methods taught in the U.S. Pat. No. 5,788,738 (which and its references are herewith included by reference in full). Other applications of the precursors include coatings, surface treatment, catalysis, reagent, precursors, tracers and markers, pharmaceuticals, biochemistry, electronics, optics, magnetic, electrochemistry etc.

Fine powders have numerous applications in industries such as, but not limiting to biomedical, pharmaceuticals, sensor, electronic, telecom, optics, electrical, photonic, thermal, piezo, magnetic, catalytic and electrochemical products. For example, biomedical implants and surgical tools can benefit from nanoscale powders. Powdered drug carriers and inhalation particulates that reduce side effects can benefit from nanoscale powders. Sputtering targets for electronic quality films and device fabrication can offer improved performance and reliability with nanopowders. Such sputtering targets can be prepared from fine powders using isostatic pressing, hot pressing, sintering, tape casting, or any other technique that yields high density compact. Optical films prepared from nanoscale powders can offer more consistent refractive index and optical performance. Passive components such as capacitors, inductors, resistors, thermistors, and varistors can offer higher reliability if powder purity is more reliable. Electrochemical capacitors prepared from nanoscale powders can offer higher charge densities, high volumetric efficiencies, and longer mean times between failures. Batteries prepared from nanoscale powders can offer longer shelf life, longer operational times, more capacity, and significantly superior performance. Chemical sensors prepared from nanoscale powder can be more selective and sensitive. Catalytic materials that are prepared from purer powders can last longer and give superior selectivity. Magnetic devices prepared from purer fine powders are expected to offer superior magnetic performance. Nanoscale powder based composites are expected to be more corrosion resistant. In general, nanoscale powders offer a means of improving the value-added performance of existing products that are produced from less pure powders.

Table 2 outlines exemplary applications of fine powders produced by techniques described in this invention.

TABLE 2

| Application | Ceramic Nanopowder Composition |
|---|---|
| ELECTRICAL DEVICES: Capacitors, Resistors, Inductors, Integrated Passive Components | Barium titanate, strontium titanate, barium strontium titanates, silicates, yttria, zirconates, nanodopants, fluxes, electrode formulations |
| ELECTRONIC PRODUCTS: Substrates, Packaging | Alumina, aluminum nitride, silicon carbide, gallium nitrides, cordierite, boron carbide, composites |
| PIEZO DEVICES: Piezoelectric transducers | PZT, barium titanate, lithium titanates, nanodopants |
| MAGNETIC DEVICES: Magnets | Ferrites, high temperature superconductors |
| Electroptics | (Pb,La) (Zr,Ti)O$_3$, nanodopants |
| Insulators | Alumina |
| CIRCUIT PROTECTION DEVICES: Varistors | ZnO, titania, titanates, nanodopants |
| SENSING DEVICES: Thermistors | Barium titanates, mangnates, nanodopants |
| ENERGY DEVICES: Fuel Cells, Batteries, Electrolytic Capacitors | Zirconia, ceria, stabilized zirconia, interconnects materials, electrodes, bismuth oxide, nanodopants, lithium cobalt oxide, lithium manganese oxide, manganese oxide, nickel metal hydrides, zinc oxide, carbides, nitrides |
| Mechanical components | Silicon nitride, zirconia, titanium carbide, titanium nitride, titanium carbonitride, boron carbide, boron nitride |
| HEALTH CARE PRODUCTS: Biomedical Devices, Implants, Surgical tools, Tracer, Marker, Drug Delivery, Topical creams | Aluminum silicates, alumina, hydroxyapatite, zirconia, zinc oxide, copper oxide, titania, polymer composites, alloys, agglomerated powders |

TABLE 2-continued

| Application | Ceramic Nanopowder Composition |
|---|---|
| COATINGS | Indium tin oxide, nanostructured non-stoichiometric oxides, titania, titanates, silicates, chalcogenides, zirconates, tungsten oxide, doped oxides, concentric coated oxides, copper oxide, magnesium zirconates, chromates, oxynitrides, nitrides, carbides, cobalt doped titania |
| Colors and Pigments | Oxynitrides, titanias, zinc oxides, zirconium silicates, zirconia, doped oxides, iron oxides, strontium aluminates, rare earth oxides, phosphors |
| Catalysts | Aluminum silicates, alumina, mixed metal oxides, zirconia, metal doped oxides, zeolites |
| Abrasives, Polishing Media | Aluminum silicates, alumina, ceria, zirconia, copper oxide, tin oxide, zinc oxide, multimetal oxides, silicon carbide, boron carbide |

Figure 3:
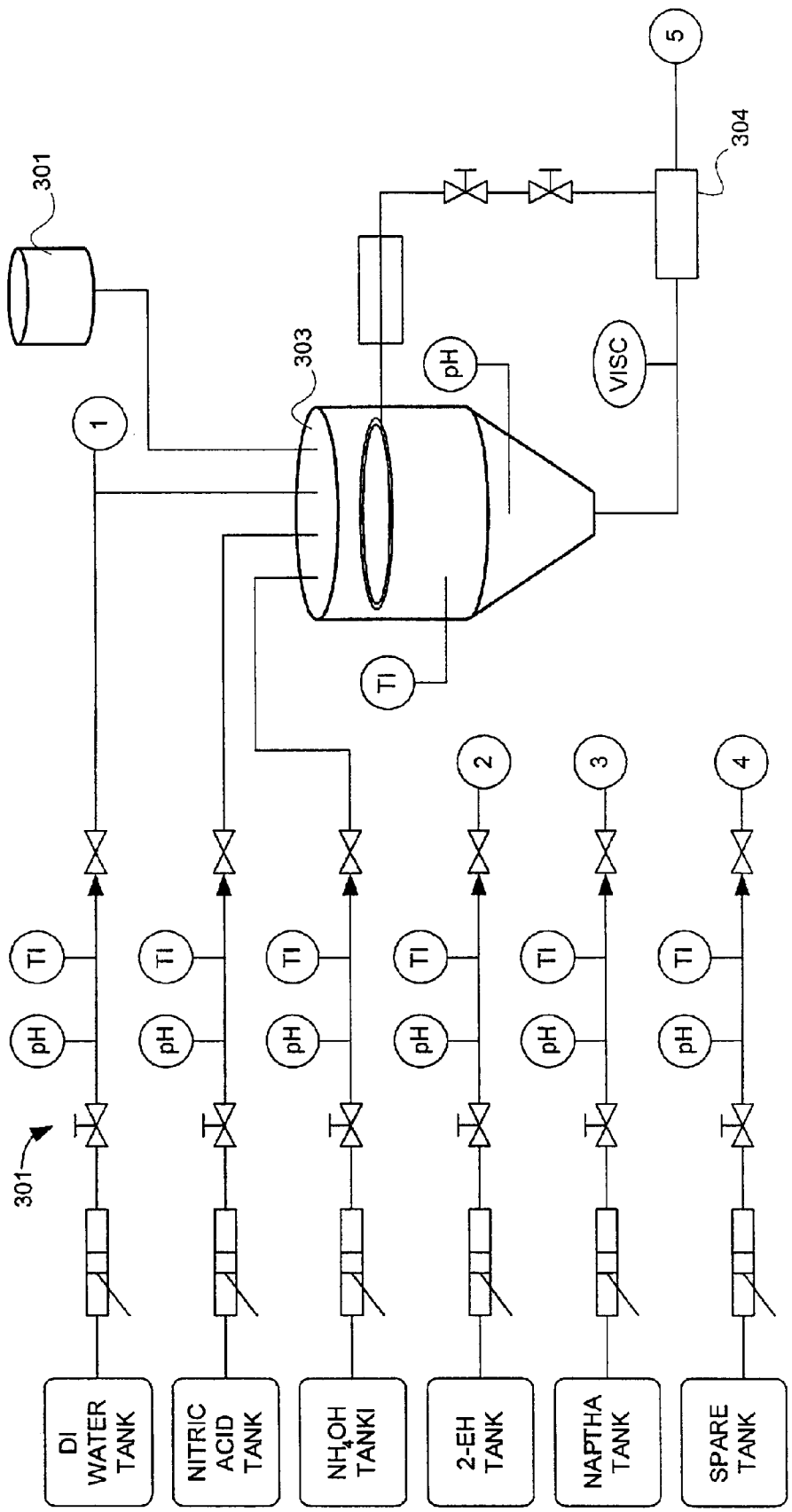
FIG. 3 shows a schematic flow diagram of a process for the continuous synthesis of precursors and nanoscale powders in accordance with the present invention.
Figure 3:
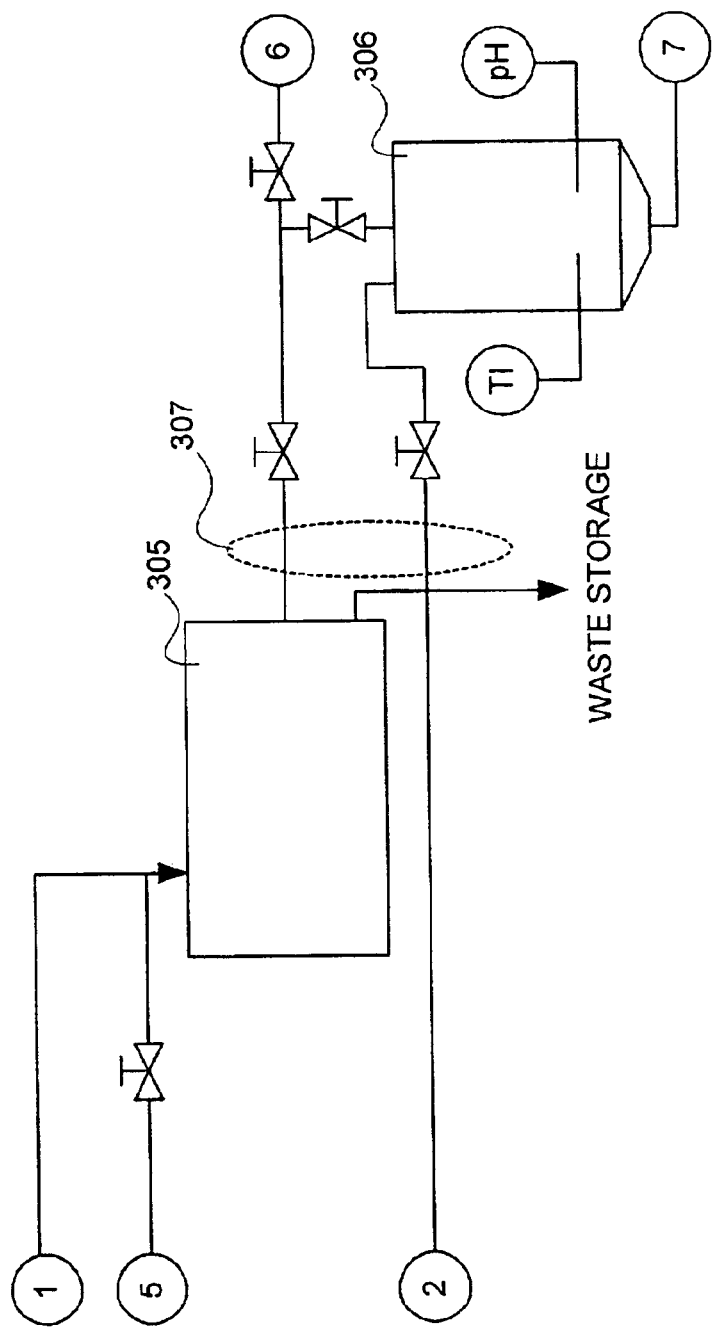

FIG. 3 shows a schematic flow diagram of a process for the continuous synthesis of precursors and nanoscale powders in accordance with the present invention. The continuous synthesis processes of FIG. 3 are analogous to the general processes described with respect to FIG. 1 and FIG. 2, but are advantageous in that the tend to provide high volume, scaleable, mass production oriented techniques. The continuous synthesis process of FIG. 3 enables a wide variety of raw materials to be processed into fine powders. Because the precursor solution or mixture that feeds the ultimate nanoscale powder process is synthesized inline, the precursor mixtures can have a much wider range of shelf life or stability that is possible when the precursor mixture is produced in advance of the synthesis process. This, in turn, increases the variety of precursor mixtures that are available with a corresponding increase in the variety of powders that can be produced.

Moreover, the continuous synthesis process of FIG. 3 often lowers the cost of producing powders as compared to processes that obtain precursors and precursor mixtures separately from the fine powder synthesis process. The control over physical and chemical properties of the precursor mixture such as composition, molecular weight, viscosity, melting point and uniformity are greatly improved.

The embodiment of FIG. 3 is intended as an example to demonstrate a particular system for continuous synthesis of fine powders from raw materials. It should be understood that a wide variety of alternatives exist for most process steps, and in many implementations process steps may be eliminated or additional process steps integrated to meet the needs of a particular application. These variations are within the scope of the present invention.

In addition to the raw material supply 301, various process chemicals such as DI water, Nitric acid, ammonium hydroxide, 2 ethylhexanoate (2-EH), and Naptha are provided. These process chemicals are coupled by metered pumps 302 to reactor 303. Preferably, temperature and pH monitors are included inline with each component. Any number of valves may be included in the system to provide additional control, safety, and/or other purposes.

Reactor 303 is preferably heated by a heater jacket or other means to control the reaction temperature. The reaction is preferably monitored by temperature and pH monitors. The output of reactor 303 is monitored for viscosity, concentration, or other parameters of interest in a particular implementation. To the extent practical, separator 304 is used to separate water, solvents, acids, or other materials. Separator 304 outputs a product to filter 305 which may be implemented as a centrifugal filter with a solid scraper in a particular example. DI water is provided to rinse the reactor product.

The product of filter 305 may be further processed by a solid digestor 306 which may be fitted with a jacketed heater. Optionally, a slurry eductor 307 is used to ease and improve flow of the product of filter 305. 2-EH may be provided to digestor 306 to react the hydroxide functional group and produces an organometallic output 7. The organometallic output from digestor 306 is further processed by a viscosity controller tank 308 to provide useful form of precursor mixture.

Alternatively, the output of filter 305 may be provided inline to flash calcinator 309 heated by a gas heater 310, or equivalent heating source. Flash calcinator 309 is one example of a mechanism for performing the thermal treatment step shown in FIG. 2. The output of flash calcinator 309 is supplied to a powder/gas filter 311 for collection of fine powders, including sub-micron and nanoscale powders.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What we claim is:

1. A method for making narrow size distribution nanoscale powders comprising:

selecting a precursor mixture wherein the mixture comprises at least one metal containing precursor;

the metal containing precursor has an average molecular weight of less than 2000 grams per unit mol of the metal;

the metal containing precursor has a normal boiling point greater than 350K;

a viscosity of the precursor mixture is between 0.1 to 250 cP;

processing the precursor mixture under conditions that produce nanoscale powder from the precursor mixture;

wherein the processing is conducted in a flow reactor system such that the axial velocity, axial length and axial dispersion coefficient in the flow reactor system yield a plug flow index of more than 50; and quenching the nanoscale powder using Joule Thompson quench.

2. The method of claim 1 wherein the metal content in the precursor mixture is greater than 22% by weight.

3. The method of claim 1 wherein the act of processing the precursor mixture comprises reacting the precursor mixture with oxygen.

4. The method of claim 3 wherein heat released during the precursor mixture's reaction with oxygen is on average greater than 1 kJ per liter of precursor mixture.

5. The method of claim 1 wherein the precursor mixture comprises at least two metal containing precursors.

6. The method of claim 1 wherein the precursor mixture comprises water.

7. The method of claim 1 wherein the precursor mixture comprises a hydrocarbon.

8. The method of claim 1, wherein the precursor mixture comprises an acetate.

9. The method of claim 1, wherein the precursor mixture comprises an alkanoate.

10. A product comprising of nanoscale powders prepared by the method of claim 1.

11. The method of claim 1 wherein the axial velocity, axial length and axial dispersion coefficient in the flow reactor system yield a plug flow index of more than 500.

12. The method of claim 1 wherein the precursor mixture comprises an organic chemical.

13. A method for making narrow size distribution nanoscale powders comprising:

selecting a precursor mixture wherein the mixture comprises at least one metal containing precursor;

the metal containing precursor has a normal boiling point greater than 350K;

a viscosity of the precursor mixture is between 0.1 to 250 cP;

processing the precursor mixture under conditions that produce nanoscale powder from the precursor mixture; and wherein the processing is conducted in a flow reactor system such that the axial velocity, axial length and axial dispersion coefficient in the flow reactor system yield a plug flow index of more than 50.

14. The method of claim 13 wherein the precursor mixture comprises an organic chemical.

15. The method of claim 13 wherein the precursor mixture comprises water.

* * * * *